(12) United States Patent
Bergstroem et al.

(10) Patent No.: US 12,480,865 B2
(45) Date of Patent: Nov. 25, 2025

(54) GAS CELL

(71) Applicant: Mettler-Toledo GmbH, Greifensee (CH)

(72) Inventors: Pär Wilhelm Bergstroem, Meilen (CH); Martin Tazreiter, Winterthur (CH); Ralph Kondziella, Straubenhardt (DE); Francesca Venturini, Dübendorf (CH); Martin Hertel, Steinen (DE)

(73) Assignee: Mettler-Toledo GmbH, Greifensee (CH)

( * ) Notice: Subject to any disclaimer, the term of this patent is extended or adjusted under 35 U.S.C. 154(b) by 325 days.

(21) Appl. No.: 17/761,714

(22) PCT Filed: Sep. 21, 2020

(86) PCT No.: PCT/EP2020/076324
§ 371 (c)(1),
(2) Date: Mar. 18, 2022

(87) PCT Pub. No.: WO2021/058439
PCT Pub. Date: Apr. 1, 2021

(65) Prior Publication Data
US 2022/0341841 A1 Oct. 27, 2022

(30) Foreign Application Priority Data
Sep. 27, 2019 (DE) .......................... 102019006763.0

(51) Int. Cl.
*G01N 21/03* (2006.01)
*G01J 3/02* (2006.01)
(Continued)

(52) U.S. Cl.
CPC ........ *G01N 21/0303* (2013.01); *G01J 3/0229* (2013.01); *G01J 3/42* (2013.01);
(Continued)

(58) Field of Classification Search
CPC ................... G01N 21/0303; G01N 2201/0614
See application file for complete search history.

(56) References Cited

U.S. PATENT DOCUMENTS 4,709,150 A * 11/1987 Burough ............ G01N 21/3504
250/338.5
2012/0281221 A1   11/2012 Studer et al.
(Continued)

FOREIGN PATENT DOCUMENTS

| CN | 102590092 A | 7/2012 |
|---|---|---|
| GB | 2568311 A | 5/2019 |

OTHER PUBLICATIONS

Guzman Certain Principles of Formation of Porous Ceramic Structures. Properties and Applications (A Review), Glass and Ceramics vol. 60, No. 9-10, pp. 280-283 (Year: 2003).*
(Continued)

*Primary Examiner* — David P Porta
*Assistant Examiner* — Shun Lee
(74) *Attorney, Agent, or Firm* — Standley Law Group LLP; Jeffrey S. Standley; Adam J. Smith (57) ABSTRACT

A gas cell (1) for the spectroscopic, in particular absorption spectroscopic, analysis of a gas, in which the gas is exposed to an incident beam of rays (S) of electromagnetic radiation and a beam of rays ($S_A$) of electromagnetic radiation exiting the gas is detected to form a measurement signal, wherein the gas cell (1) comprises a body (10) formed by a porous, electromagnetic radiation-scattering material, an in-coupling device (20) for coupling the incident beam of rays (S) into the gas cell (1) and an out-coupling device (30) for coupling the exiting beam of rays ($S_A$) out of the gas cell (1), wherein, according to the invention, the gas cell is further developed according to the invention by forming a material-free cavity (12) in the body (10), which is surrounded by an
(Continued)

inner surface (14) running within the material and is both diffusely reflecting and transmitting the electromagnetic radiation.

20 Claims, 4 Drawing Sheets (51) Int. Cl.
 G01J 3/42 (2006.01)
 G01N 21/39 (2006.01)
(52) U.S. Cl.
 CPC .. G01J 2003/423 (2013.01); G01N 2021/399 (2013.01); G01N 2201/0614 (2013.01); G01N 2201/0634 (2013.01)

(56) References Cited

U.S. PATENT DOCUMENTS

2016/0209388 A1* 7/2016 Yakovlev ............... G01N 21/39
2020/0072740 A1 3/2020 Venturini et al.

OTHER PUBLICATIONS

Lewander et al. Food monitoring based on diode laser gas spectroscopy, Applied Physics B vol. 93, pp. 619-625 (Year: 2008).*
Yu et al. Effective optical path length investigation for cubic diffuse cavity as gas absorption cell, Applied Physics B vol. 116, pp. 135-140 (Year: 2013).*
Mei et al. Pathlength Determination for Gas in Scattering Media Absorption Spectroscopy, Sensors vol. 14, No. 3, pp. 3871-3890 (Year: 2014).*
Schuurmans et al. Strongly Photonic Macroporous Gallium Phosphide Networks, Science vol. 284, No. 5411, pp. 141-143 (Year: 1999).*
Aparna.A.R. et al. Review on Synthesis and Characterization of Gallium Phosphide, Procedia Materials Science vol. 6, pp. 1650-1657 (Year: 2014).*
Cone et al. Diffuse reflecting material for integrating cavity spectroscopy, including ring-down spectroscopy, Applied Optics vol. 54, No. 2, pp. 334-346 (Year: 2015).*
Moore et al. Chemical, biological, and trace gas detection and measurement with a newly developed integrating Cavity Enhanced Raman (iCERS) technique, Proceedings of SPIE vol. 10657, 106570M, 16 pages (Year: 2018).*
Bixler, Integrating cavity enhanced spectroscopy for liquid and gas sensing, Thesis, 176 pages (Year: 2015).*
Hodgkinson J. et al., Using integrating spheres as absorption cells: path-length distribution and application of Beer's law, Applied Optics, vol. 48, No. 30, pp. 5748-5758, Oct. 20, 2009.
Mei L. et al., Pathlength Determination for Gas in Scattering Media Absorption Spectroscopy, Sensors, 2014, 14, pp. 3871-3890, Feb. 25, 2014.
Sjöholm M. et al., Analysis of gas dispersed in scattering media, Optics Letters, vol. 26, No. 1, pp. 16-18, Jan. 1, 2001.
Venturini F. et al., Characterization of strongly scattering nanoporous materials as miniaturized multipass cell for tunable diode laser absorption spectroscopy, Applied Physics B Lasers and Optics, Apr. 10, 2017, vol. 123:136, pp. 1-8, Springer International, Berlin, Germany.

* cited by examiner

GAS CELL

TECHNICAL FIELD

The invention relates to a gas cell for the spectroscopic, especially absorption spectroscopic, analysis of a gas, in which the gas is exposed to an incident beam of rays of electromagnetic radiation and a beam of rays of electromagnetic radiation exiting from the gas is detected to form a measurement signal, wherein the gas cell has a body made of a material that scatters electromagnetic radiation and an in-coupling device for coupling the incident beam of rays into the gas cell and an out-coupling device for out-coupling the beam of rays exiting from the gas cell.

BACKGROUND AND SUMMARY OF THE INVENTION

Spectroscopic analysis of gases, for example absorption spectroscopy or Raman spectroscopy, enables the determination of characterizing features, especially the gas concentration. This has wide-ranging applications, for example in industrial processes or in the observation of environmental changes.

Absorption spectroscopy is based on the measurement of the absorption undergone by an incident beam of rays of electromagnetic radiation during passage through a gas. If the frequency of the electromagnetic radiation coincides with a resonance frequency of the gas, absorption of the electromagnetic radiation occurs; this can be detected by weakening of the intensity of the exiting beam of rays. Suitable sources of radiation especially include lasers which are tunable in a specified frequency range. The absorption is then detectable as a reduction in the intensity of the exiting beam of rays at the corresponding resonance frequencies of the gas.

The basis for absorption spectroscopy is the Beer-Lambert law. For a beam of rays incident on a gas of known temperature with intensity $I_0$, the intensity I of the radiation transmitted by the gas is given by the following equation:

$$I = I_0 \cdot e^{-\alpha \cdot z}.$$

Here, z is the optical path length, i.e., the path length which the radiation has traveled in the gas. $\alpha$ designates the absorption coefficient, $\alpha = c \cdot \varepsilon$, where $\varepsilon$ is the extinction coefficient and c is the concentration of the gas. Thus, if the extinction coefficient and optical path length are known, the concentration c of the gas can be determined.

A special technique within absorption spectroscopy is the so-called absorption spectroscopy using tunable diodes, also known as TDLAS (tunable diode laser absorption spectroscopy). Here, the source of the laser radiation is a laser diode. The laser radiation is tuned using typical absorption lines of the gas, and the decrease in intensity of the exiting beam of rays is measured using a detector. TDLAS enables the measurement of very low gas concentrations.

It is apparent from the formula presented that the detection sensitivity of absorption spectroscopic methods for determining gas concentration depends on the optical path length. Thus, it is a goal to extend the optical path length in absorption spectroscopic methods in order to achieve improved detection sensitivity.

One known method of extending the optical path length consists of using so-called multipass gas cells. With these, the electromagnetic radiation is guided repeatedly through the gas being examined. Known examples of multipass gas cells include the White gas cell and the Herriott gas cell. In these, the attainable optical path length is proportional to the gas cell volume (defined as the volume enclosed by the outer surface of the body), and relationships of optical path length $L_O$ to gas cell volume V of $L_O/V = 7.5 \cdot 10^2$ m$^{-2}$ for the White gas cell and $L_O/V = 3 \cdot 10^4$ m$^{-2}$ for the Herriott gas cell can be achieved. Therefore, a relatively large gas cell volume is necessary for optical path length extension in the range of several meters. However, gas cells with large gas cell volumes are unfeasible in certain applications. The response time of the gas cell, which increases with the gas cell volume, is also disadvantageous for use.

The detection sensitivity of multipass gas cells is also limited by interference effects caused by formation of Fabry-Perot etalons between reflecting or dispersive surfaces of the multipass gas cells, for example, mirrors, lenses, et cetera. To reduce interference effects, further optical components are added to the gas cells. However, these lead to diffuse reflection of the electromagnetic radiation, causing speckle formation.

To solve these problems, the use of a so-called Ulbricht sphere for absorption spectroscopy was suggested (see, e.g., J. Hodgkinson et al., Applied Optics Vol. 48, No. 30, 2009). Here, a spherical hollow for introduction of the gas to be measured is formed in a body. The surface of the hollow is reflective for the radiation used. The optical path length in the spherical shell can then be approximated by the expression g $$\frac{4}{3} \frac{R}{1-\rho},$$

where R is the radius of the spherical shell and $\rho$ is the reflectivity on the inner surface of the spherical shell. Since the optical path length is a linear function of the radius of the spherical shell, the use of spherical shell with a large radius is necessary, which may be disadvantageous for certain applications. An additional problem with the Ulbricht sphere is gas exchange. The gas must be introduced into the hollow, and the provision of an inflow and outflow device impairs the achievable optical path length.

Another possibility for extending the optical path length is supplied by the so-called GASMAS method (gas in scattering media absorption spectroscopy) (M. Sjöholm et al., Optics Letters Vol. 26, 16-18, 2001). This method is based on the use of porous materials for extending the path length. A porous material is penetrated by a gas to be measured. The material is selected such that it has high dispersive properties for the absorption wavelength of the gas and low absorption. The electromagnetic radiation incident on the material is then scattered multiple times at the pores (multiple scattering), thus enabling the achievement of an optical path length corresponding to a multiple of the thickness of the porous material. Additional possibilities for use of GASMAS methods are disclosed, for example, in L. Mei et al., "Pathlength Determination for gas in Scattering Media absorption Spectroscopy", Sensors 2014; 14 (3): 3871-3890 and include the use of macroscopically homogeneous porous media and inhomogeneously porous media in which one or more larger cavities are formed in a pore-free, dispersive matrix material. WO 2018/210583 A1 discloses the use of a porous ceramic for a gas cell.

In the past, GASMAS was already combined with TDLAS for conducting an absorption spectroscopic analysis of gases in porous materials and thus achieving improvement of the detection sensitivity. In such cases, however, the detection sensitivity is limited by optical interference noise. To solve this problem, so-called laser beam dithering was suggested, but this requires that optical components be moved, which is difficult to realize in commercial cells. WO 2018/210583 A1 suggests as an alternative the use of a broadened, unfocused laser beam falling on a gas cell with porous material. This leads to elimination of the interference effects.

With the use of porous material for absorption spectroscopy up to now, an optical path length is obtained which increases with the thickness of the porous layer used. However, the intensity of the transmitted radiation increases with the layer thickness, so that the layer thickness can only be increased until the intensity of the exiting beam of rays has fallen to a minimum necessary for detecting it. This effect and the dimensions of the gas cell thus limit the maximum achievable optical path length.

EP 2 520 924 A1 and U.S. Pat. No. 4,709,150 A also disclose gas measurement systems.

In view of the problems with the state of the art mentioned, it is the goal of the present invention to further develop a gas cell of the initially mentioned type so that a high detection sensitivity is achieved with a simultaneously compact design.

This goal will be achieved according to the invention in that a material-free cavity which is surrounded by a surface that both diffusely reflects and also transmits electromagnetic radiation will be formed in the body.

The invention is based on the recognition that a gas cell of this type, compared with conventional gas cells, provides a considerably higher relationship of optical path length to gas cell volume. In this case the gas cell volume is defined as the volume enclosed by an external surface of the body of the gas cell.

Here, the high relationship of optical path length to gas cell volume is produced by both the diffuse reflection of the radiation at the inner surface of the cavity and the transmission of the radiation into the radiation-scattering porous material. The interplay of the two effects can be understood as follows:

A beam of rays of electromagnetic radiation that can be coupled into the gas cell using the in-coupling device enters the cavity. The incident beam of rays may be convergent, divergent, or cylindrical. The beam of rays strikes a region of the interior surface of the cavity and is partially reflected diffusely on the surface and partially transmitted into the porous material. The diffusely reflected fraction of the radiation strikes additional areas of the inner surface of the cavity, at which again diffuse reflection or transmission takes place.

The transmitted fraction of the radiation enters the porous material. As was explained above, multiple scattering of the radiation takes place in the porous material. Preferably the material exhibits little or no absorption of the radiation. Following a plurality of scatterings, the radiation transmitted into the material re-enters the cavity. The transmitted radiation has then travelled an additional path length compared to the radiation reflected at the surface. Once the radiation has re-entered the cavity, it strikes additional regions of the inner surface of the cavity. There, as just described above, the radiation is partially reflected and partially transmitted into the porous material. This process is repeated until the radiation is decoupled from the gas cell by the decoupling device.

As a result of the diffuse reflection at the inner surface and the scattering in the porous material, the exiting beam of rays of the electromagnetic radiation is composed of a plurality of rays, which have covered different path lengths in the body and the cavity. On average, the exiting beam of rays has travelled a path length L+Z, where L is the fraction of the mean path length inside the cavity and Z is the fraction of the mean path length in the porous material. In this case the mean path length Z in the porous material is much greater than the mean path length L in the cavity.

Thus, the gas cell described above is very well suited for use in absorption spectroscopy. For this, the gas cell is brought into contact with the gas being measured. The porous material is gas-permeable to the gas being measured. The gas penetrates into the porous material and into the cavity. If an incident beam of rays is then coupled into the gas cell, the exiting beam of rays has travelled, on average, the path length L+Z through the sample gas. Since Z is much larger than L, most of the absorbance is due to the interaction of the electromagnetic radiation with the gas in the porous material.

The electromagnetic radiation enters the porous material surrounding the cavity multiple times, interacting with the gas there. Thus, a very high relationship of optical path length to gas cell volume can be achieved with the gas cell according to the invention. This makes compact design with simultaneously high detection sensitivity and rapid possible. The high detection sensitivity is based on the large achievable optical path length. The rapid response time is due to the relatively small gas cell volume and the gas exchange over the entire surface of the gas cell. At the same time, the porous structure permits gas exchange within a few seconds and thus rapid detection of concentration changes. Gas input or gas output through a complicated system of tubing and pumps is not necessary for this. As a result of the compact design, the gas cell according to the invention has a large number of possible applications and can be produced at reasonable cost.

As was explained above, the part of the electromagnetic radiation reflected on the inner surface of the cavity partially enters the porous material upon again striking the inner surface of the cavity. Consequently, the losses of intensity of the exiting beam of rays seen with the conventional GASMAS process, caused by reflection on the entry side of the beam of rays, are avoided.

Furthermore, the occurrence of interference effects is avoided because of the diffuse scattering of the radiation on the surface of the cavity and in the material. This results in a further improvement in the detection sensitivity of the gas cell.

An additional advantage of the gas cell in accordance with the invention lies in the fact that the porous material acts as a barrier, which hinders the entry of larger molecules into the cavity or into the porous material itself. Only molecules of a size smaller than the size of the pores can penetrate into the nanoporous material or pass through it and reach the cavity. Thus, the porous material acts as a filter or as a membrane. The interior of the cavity is therefore protected from fouling and remains clean.

Furthermore, the material enclosing the cavity acts as a flame arrestor. On one hand, the porous material itself is not readily flammable. On the other hand, because of the multiple reflections in the gas cell, the measurements can be performed with less output power overall, so that heating of the gas cell by the incident beam of rays can be prevented or at least strongly reduced. If ignition within the cavity should nevertheless occur, no flames will escape from the gas cell, since the gas will have already cooled too far. Therefore, higher optical performance can be made possible, such that the gas cell can simultaneously fulfil the requirements of the ATEX and/or FM explosion prevention guidelines.

According to one embodiment of the invention, the material comprises porous ceramic material in which the cavity is formed. The optimal size of the pores and their distribution is determined experimentally and depends on the wavelength used for the gas being evaluated and on the ceramic material used. A pore size of 20 nm to 10 µm is advantageous for radiation in the mid-infrared range. For example, a pore size of 100 to 300 nm can be used for a wavelength of 760 nm.

The porous ceramic material can, for example, contain zirconium oxide, aluminium oxide, titanium oxide, silicon oxide, magnesium oxide, yttrium oxide, gallium phosphide, porous silicon or mixtures thereof.

The porosity of the material can amount to a minimum of 25%, preferably a minimum of 30%, more preferably a minimum of 35% and a maximum of 70%, preferably a maximum of 65% and more preferably a maximum of 60%. If the porosity is less than 25%, the material is very dense, and the effect of path length extension by scattering on the pores is too slight. On the other hand, if the porosity is greater than 70%, the porous material is unstable and not suitable for use for the body of a gas cell.

The cavity can have any arbitrary shape. In one possible embodiment, the cavity has the shape of a spherical shell with radius $R_K$. However, the cavity can also have other shapes, for example the shape of an ellipsoid.

Here, the volume and/or the inner surface of the cavity can be selected with consideration of the signal-to-noise ratio. Indeed, it was shown experimentally that the signal-to-noise ratio is a function of the cavity volume and the internal surface area, and therefore improvement of the signal-to-noise ratio can be achieved by suitably dimensioning the volume of the cavity and/or the internal surface area. If the cavity has the form of an spherical shell, the radius $R_K$ of the spherical shell can be selected under consideration of the signal-to-noise ratio, and the radius $R_K$ of the spherical shell can preferably amount to a minimum of 2 mm, more preferably a minimum of 5 mm, even more preferably a minimum of 10 mm and still more preferably a minimum of 15 mm. If too small a radius of the spherical shell is selected, the absorbance will be too low, leading to a poor signal-to-noise ratio.

According to one embodiment of the invention the body has an outer surface which surrounds the inner surface of the cavity at a distance at which leakage radiation exiting at the outer surface is less than a specified loss limit. The loss limit is preferably less than or equal to 99% of the intensity of the incident beam of rays, more preferably less than or equal to 95% of the intensity of the incident beam of rays and even more preferably less than or equal to 90% of the intensity of the incident beam of rays. As was explained in the preceding, the inner surface of the cavity is both reflective and transmissive for electromagnetic radiation. The transmitted radiation incident in the material can reach the outer surface of the body and emerge from the body there as leakage radiation. But if the distance between the inner surface of the cavity and the outer surface of the body is selected to be large enough, only a small fraction of the radiation that has penetrated into the porous material will reach the outer surface. The rest will be redirected into the cavity by scattering on the pores of the material. For a strongly scattering material, a distance of 3 to 4 mm between the inner surface of the cavity and the outer surface of the body may be sufficient to limit the escape of leakage radiation to a reasonable amount. This will improve the intensity of the exiting beam of rays and thus the signal-to-noise ratio.

In a gas cell according to the invention, the relationship of the optical path length $L_O$ traveled by the beam of rays in the gas cell to the enclosed gas cell volume V, $L_O/V$, may be greater than or equal to $10^5$ m$^{-2}$, preferably greater than or equal to $2 \cdot 10^5$ m$^{-2}$, more preferably greater than or equal to $3 \cdot 10^5$ m$^{-2}$. For example, for a gas cell with a gas cell volume of $V=4 \cdot 10^{-5}$ m$^3$, an optical path length $L_O$ of more than 8 m can be reached. In an additional exemplary embodiment of the invention with a gas cell volume of $V=4.5 \cdot 10^{-6}$ m$^3$, an optical path length $L_O$ of 1.4 m can be reached. This is a considerable improvement over conventional gas cells, such as the White gas cell and the Herriott gas cell.

In one embodiment of the invention the in-coupling device for divergent in-coupling of the incident beam of rays can be formed in the cavity. When a divergent beam of rays enters the cavity, the development of disruptive interference effects will be further suppressed. The in-coupling device and/or the out-coupling device may contain a light guide. Divergent in-coupling can then be achieved by using a light guide with the highest possible numerical aperture. For example, a fiber with a numerical aperture of 0.22 to 0.50 can be used. In addition or alternatively, a lens that broadens the beam of rays may be disposed in the end of the light guide, which couples into the gas cell.

The in-coupling device can be used for coupling the electromagnetic radiation of the incident beam of rays into the cavity. The in-coupling device can be designed such that it couples all of the electromagnetic radiation of the incident beam of rays into the cavity. Alternatively, the in-coupling device can be designed such that it couples only part of the electromagnetic radiation of the incident beam of rays into the cavity. Additionally or alternatively, the out-coupling device can also be designed for coupling the electromagnetic radiation forming the exiting beam of rays out of the cavity. The out-coupling device can be designed such that it couples all of the electromagnetic radiation of the exiting beam of rays out of the cavity. Alternatively, the out-coupling device can be designed such that it out-couples only part of the electromagnetic radiation of the exiting beam of rays out of the cavity. If the in-coupling device and/or the out-coupling device has a light guide, this can be guided from the outer surface of the body, through the body, to the cavity. In other words, the light guide extends to the cavity or into the cavity. This permits particularly simple in-coupling and/or out-coupling of the electromagnetic radiation into the cavity/out of the cavity.

In the embodiment explained above, the light guide intersects the inner surface of the cavity. As a result, the area of the inner surface at which the electromagnetic radiation can be reflected is reduced. Since in addition the light guide extends through the porous material, in this area the incident electromagnetic radiation cannot be scattered in the porous material. Both effects lead to a reduction of the optical path length extension. This reduces the absorbance. On the other hand, the use of a light guide with a large cross section enables improvement of the signal-to-noise ratio. Therefore, in one embodiment of the invention the size of the in-coupling and/or out-coupling device in the body is selected under consideration of the absorbance and/or the signal-to-noise ratio. For a cavity with the form of an spherical shell with radius $R_K$=7 mm, particularly good absorbance can be achieved by means of a fiber with a radius of 300 µm. On the other hand, the signal-to-noise ratio can be optimized using a fiber with a radius of 750 μm. For a cavity with a radius of $R_K=7$ mm, an optical fiber with a radius between 300 μm and 750 μm is advantageous.

The in-coupling device can be designed for coupling electromagnetic radiation of the incident beam of rays into the porous material-containing area of the body. The in-coupling device can be designed such that all of the electromagnetic radiation of the incident beam of rays is coupled into the porous material-containing area of the body. Alternatively, the in-coupling device can be designed such that it couples only part of the electromagnetic radiation of the incident beam of rays into the area of the body containing porous material. Additionally or alternatively, the out-coupling device can be designed for out-coupling the electromagnetic radiation that forms the exiting beam of rays from the area of the body that contains the porous material. The out-coupling device can be designed such that it out-couples all of the electromagnetic radiation forming the exiting beam of rays from the area of the body that contains the porous material. Alternatively, the out-coupling device can be designed such that it out-couples only part of the electromagnetic forming the exiting beam of rays from the area of the body containing the porous material.

For example, if the out-coupling device has a light guide, the radiation from the end of the light guide out-coupling the radiation from the body can be arranged at a distance a from the inner surface of the cavity in the porous material. In this way it is possible to prevent the beam of rays incident in the cavity, following reflection, from being immediately decoupled out of the cavity again without having passed through the porous material. This is because of the distance between the inner surface of the cavity and the out-coupling end of the fiber, the electromagnetic radiation always traverses at least the distance a before entering the out-coupling device. For example, a can be 1 mm.

The out-coupling device can also be arranged completely outside of the body. Then, however, the distance between the inner surface of the cavity and the outer surface of the body can be selected such that the electromagnetic radiation can reach the out-coupling device with sufficient intensity. This arrangement makes it possible to maximize the absorbance.

In one embodiment of the invention, the in-coupling device can couple all of the electromagnetic radiation of the incident beam of rays into the cavity. The out-coupling device can then be designed such that it out-couples all of the electromagnetic radiation forming the exiting beam of rays out of the cavity. Alternatively, the out-coupling device can be designed such that it out-couples all of the electromagnetic radiation forming the exiting beam of rays out of the region of the body containing the porous material.

The gas cell according to the invention can be used for the absorption spectroscopic analysis of a gas. For this purpose, the gas cell will be brought into contact with the gas to be measured. The porous material is permeable to the gas being measured. The gas penetrates into the porous material and into the cavity. If electromagnetic radiation of a suitable wavelength is coupled into the gas cell through the in-coupling device, the concentration of the gas can be determined by measuring the intensity of the radiation decoupled through the out-coupling device according to the Beer-Lambert Law (see the preceding). The optical path length in the gas cell is determined in advance using measurements with a gas of known concentration.

In addition, the invention relates to an arrangement for the absorption spectroscopic analysis of a gas, having:
 a gas cell according to any one of the aforementioned aspects;
 a source of electromagnetic radiation for producing the incident beam of rays;
 a detector arrangement for recording the exiting beam of rays.

The source of electromagnetic radiation can have a laser light source. In particular it may have a tuneable laser diode. The detector arrangement may have a photodetector.

The gas cell according to the invention as well as the arrangement according to the invention for the absorption spectroscopic analysis of a gas can be used for determining the concentration of one or more of the following gases: oxygen, carbon dioxide, carbon monoxide, nitrogen monoxide, methane, amines, ammonia, hydrogen sulfide, sulfur oxides, hydrogen halides such as HCl or HF, water, or mixtures thereof.

BRIEF DESCRIPTION OF THE DRAWINGS

In the following description, the invention will be explained, referring to the drawings as examples. In the drawings, the following are shown.

DETAILED DESCRIPTION OF EXEMPLARY EMBODIMENT(S)

Figure 1:
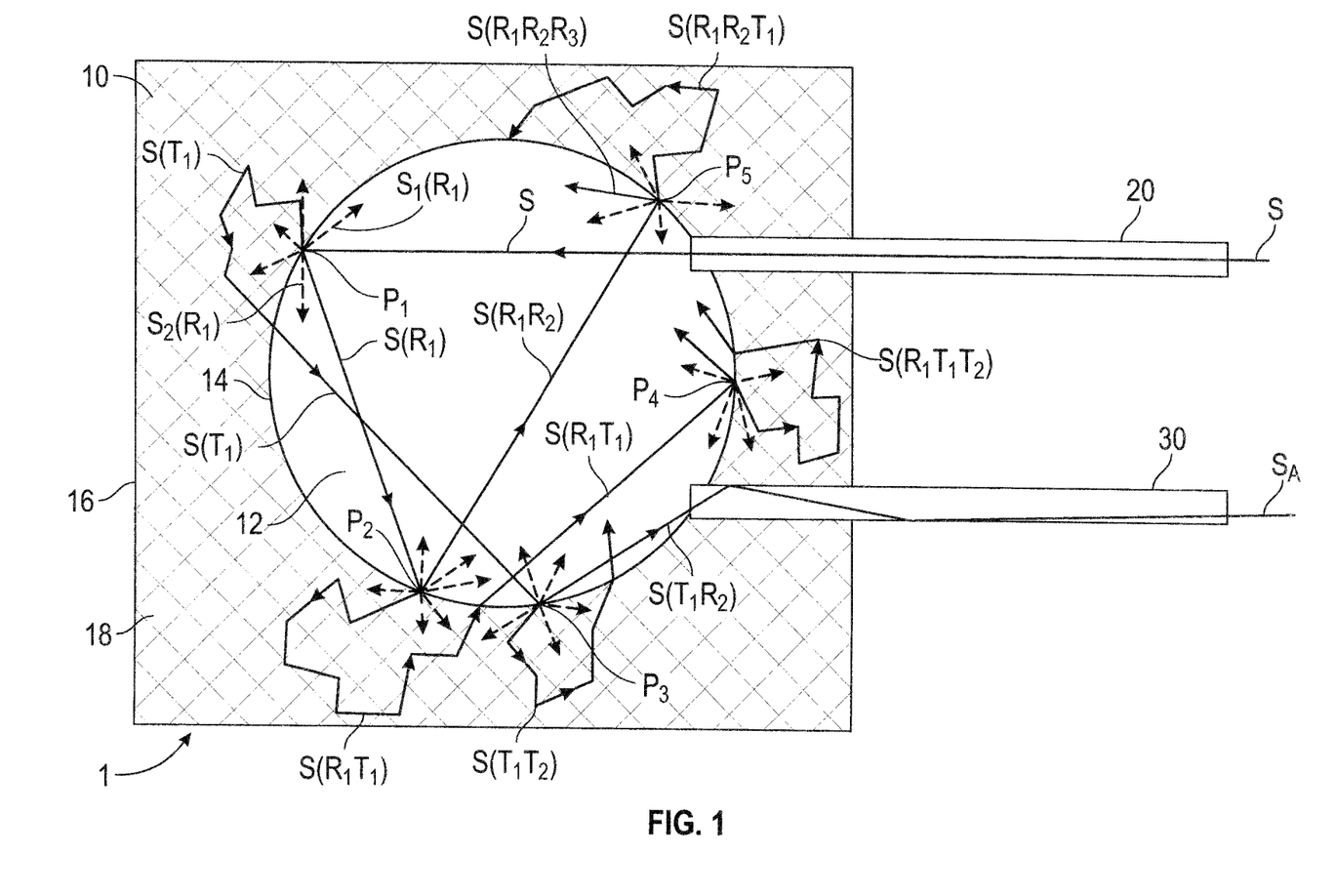
FIG. 1 a sectional view of a first embodiment of a gas cell according to the invention, wherein part of the beam path inside the gas cell is shown by way of example, FIG. 2a a sectional view of the gas cell shown in FIG. 1, FIG. 2b a sectional view of a first modification of the gas cell shown in FIG. 2a, FIG. 2c a sectional view of a second modification of the gas cell shown in FIG. 2a, FIG. 3a a sectional view of a second embodiment of a gas cell according to the invention, FIG. 3b a sectional view of a modification of the gas cell shown in FIG. 3a, FIG. 4a a sectional view of a third embodiment of a gas cell according to the invention, FIG. 4b a sectional view of a modification of the gas cell shown in FIG. 4a, FIG. 5 a sectional view of components of a fourth embodiment of a gas cell according to the invention, FIG. 6 a sectional view of a fifth embodiment of a gas cell according to the invention.

FIG. 1 is a sectional view of a first embodiment of a gas cell according to the invention 1, wherein part of the beam path within the gas cell 1 is shown as an example. The gas cell 1 has a body 10. The body 10 can, for example, be block-shaped. The body 10 is made of a porous material that scatters electromagnetic radiation. In the body 10 a material-free cavity 12 is formed. In the present embodiment the cavity 12 has the form of an spherical shell. The cavity 12 is delimited by an inner surface 14. The body 10 has an outer surface 16 which surrounds the inner surface 14 of the cavity 12 at a distance.

The gas cell 1 also has an in-coupling device 20 for coupling an incident beam of rays S into the gas cell 1. In the present embodiment, the in-coupling device 20 has a light guide. For this purpose, a material-free area is provided in the body 10, through which the light guide can be introduced from the outside of the gas cell 1 into the cavity 12. In the present embodiment, the in-coupling device 20 couples all of the electromagnetic radiation of the incident beam of rays into the cavity 12. In addition, the gas cell 1 has an out-coupling device 30. In the present embodiment the out-coupling device 30 out-couples all of the electromagnetic radiation forming the exiting beam of rays SA out of the cavity. Furthermore, in the present embodiment the out-coupling device 30 has a light guide. An additional material-free area in the body 10 is provided, through which the light guide can pass from the cavity 12 to the outside of the body 10.

The beam of rays is coupled through the light guide of the in-coupling device 20 from the outside of the body 10 into the cavity 12. The in-coupling device 20 can be designed in such a way that the incident beam of rays S is coupled into the cavity 12. For this purpose, for example, a light guide with a high numerical aperture can be used. Alternatively, a lens can be provided at the end of the light guide opening into the cavity 12.

In the following, the beam path within the gas cell 1 will be explained. To facilitate visualization, only the track of the principal ray of the beam of rays (also abbreviated as beam S) will be shown.

The beam S coupled into the cavity 12 passes through an area of the cavity 12 and then strikes a point P1 on the inner surface 14 of the cavity 12. According to the invention, the inner surface 14 is both diffusely reflective and transmitting for electromagnetic radiation. Thus, part of the beam S will be diffusely reflected at point P1 on the inner surface 14 of the cavity 12, and part of the radiation will be transmitted into the porous material at point P1 on the inner surface 14. By way of example, three reflected beams S (R1), $S_1$ (R1) and $S_2$ (R1) are shown in FIG. 1. However, to facilitate visualization, only the further path of the reflecting beam S (R1) is shown. The path of beams $S_1$ (R1) and $S_2$ (R1) is not further shown, and therefore the beams are represented as dashed arrows. The transmitted portion of the beam S enters the porous material in various directions. As in the case of the reflected radiation, to simplify visualization, only the path of a single beam S (T1) will be shown. For clarification, three additional beams entering the material at point P1 are drawn in. Since their path will not be further described hereinafter, these are shown as dashed arrows. The beam S (T1) traveling in the porous material will be scattered multiple times in the porous material before again entering the cavity 12.

The path of the reflected beam S (R1) and the transmitted beam S (T1) will now be described. The reflected beam S (R1) strikes the inner surface 14 of the cavity 12 at a second point P2 and at that point part of it is again reflected diffusely while another part is transmitted into the porous material. Here also, as in the case of point P1, there are several reflected and transmitted beams, wherein to facilitate visualization only one reflected beam and one transmitted beam are shown in each case. The reflected part S (R1, R2) travels further through the cavity 12 until it strikes a point P5 on the inner surface 14 of the cavity 12. There again part of it is reflected and another part is transmitted.

The beam S (T1) transmitted at point P1, after re-entering the cavity 12, passes through this until it strikes the inner surface 14 of cavity 12 at a point P3, where it is partially reflected and partially transmitted. The reflected part S (T1, R2) enters the light guide of the out-coupling device 30 and is decoupled from the gas cell 1 as a contribution to the exiting beam of rays $S_A$ (for simplification, only one beam $S_A$ is shown in the drawing). Similarly, the other beams continue to travel through the cavity 12 and partially through the porous material, finally entering the light guide of the out-coupling device 30 and being out-coupled from the gas cell 1.

Thus, the exiting beam of rays SA is composed of a plurality of exiting beams, which have covered different optical path lengths within the gas cell 1. The exiting beam of rays SA has covered an effective path length $L_{eff}=L+Z$, where L represents the effective path length inside of the cavity 12 and Z represents the effective path length within the porous material.

Hereinafter the die optical path length extension of the gas cell 1 shown in FIG. 1 will be compared with that of an Ulbricht sphere. In the latter, the inner surface is almost completely reflecting, and the cavity is not surrounded by a porous material, so that the path length extension is only produced by the path within the spherical shell. For an spherical shell with a radius of 5 mm and a reflectivity of 0.985, the effective path length in the case of the Ulbricht sphere is 0.44 m. In the case of the embodiment shown in FIG. 1, the effective path length is more than 3 m. In the case of an spherical shell with a radius of 15 mm and a reflectivity of 0.985 the effective path length for the Ulbricht sphere is 1.33 m, and the effective path length for the gas cell shown in FIG. 1 is more than 8 m. In other words, using the gas cell 1 according to the invention, the effective path length can be increased considerably compared with an Ulbricht sphere.

Figure 2A:
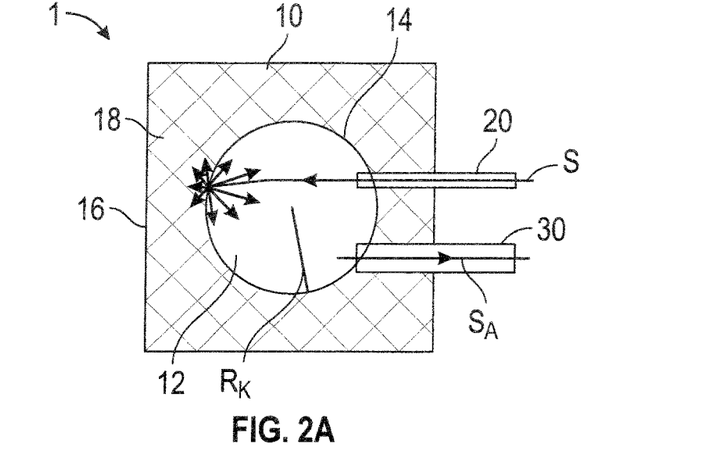
Figure 2B:
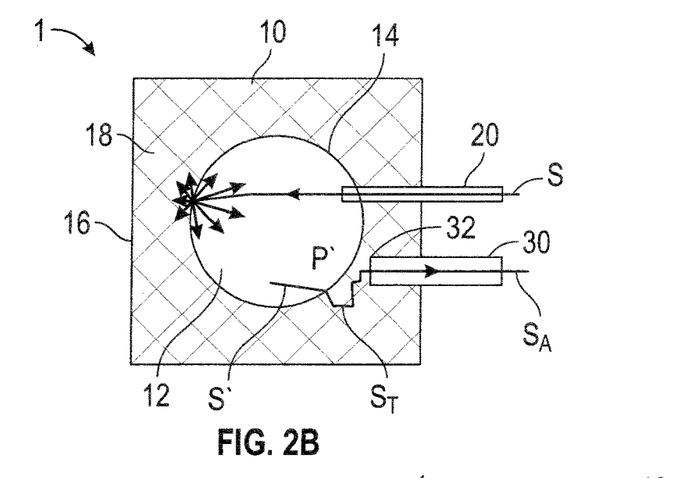
Figure 2C:
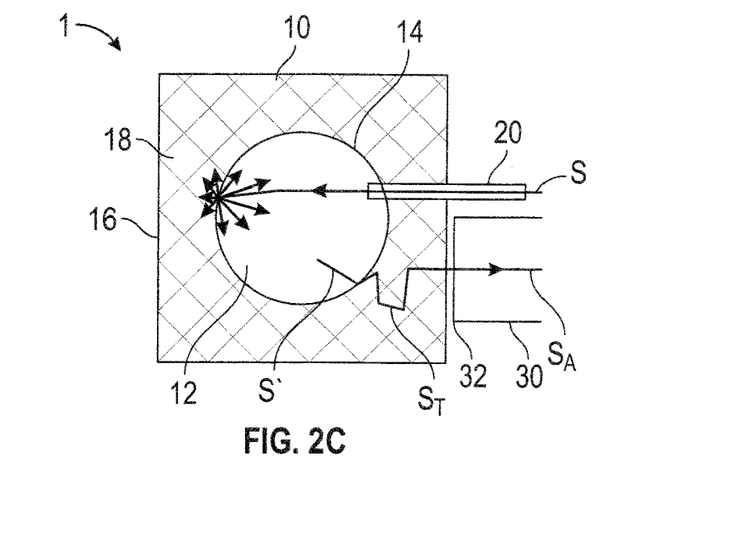

FIGS. 2a to 2c show three possibilities for setting up the out-coupling device 30 for a gas cell 1 with a cavity 12 in the form of an spherical shell. These possibilities, however, are not limited to the cavity in the form of an spherical shell and can be used for any arbitrary form of a cavity.

FIG. 2a shows the first embodiment of the invention, presented in FIG. 1. As was explained in connection with FIG. 1, both the in-coupling device 20 and the out-coupling device 30 (for example in the form of light guides, in particular optical fibers) extend from the outside of the gas cell 1 out through the porous material into the cavity 12. The following problems can occur with this arrangement of the in-coupling and out-coupling devices 20, 30:

There is a part of the exiting beam of rays SA which was reflected only at the reflecting surface after entry into the cavity. Therefore, this part of the beam of rays has not traveled through the porous material. This results in a decrease of the attainable optical path length.

In addition, the in-coupling und out-coupling devices 20, 30 reduce both the area of the inner surface 14 at which the electromagnetic radiation can be reflected and the volume of the porous material in which the electromagnetic radiation can be reflected.

One solution to these problems is shown in FIG. 2b. Here, the out-coupling device 30 does not reach the cavity 12 but ends in the porous material. To be decoupled by the out-coupling device 30, the electromagnetic radiation therefore must travel at least the area between the inner surface 14 of the cavity 12 and the entry end 32 of the out-coupling device 30 in order to be decoupled from the gas cell 1 (see the path of the beam S', which is transmitted into the porous material at point P' and enters the light guide as the transmitted beam $S_T$). Here, the radiation passes through the porous material and thus undergoes an additional path length extension. The out-coupling device 30 thus out-couples the electromagnetic radiation forming the exiting beam of rays $S_A$ from the area 18 of the body 10 containing the porous material.

As a result of the modification shown in FIG. 2c, a further enlargement of the effect shown in FIG. 2b can be achieved. Here, the out-coupling device 30 is located completely outside of the body 10. In this case, however, the distance of the entry end 32 of the out-coupling device 30 from the cavity 12 must be small enough to receive an adequate signal. In the case of a light guide, an improvement of the signal-to-noise ratio can be achieved by increasing the diameter of the light guide.

Figure 3A:
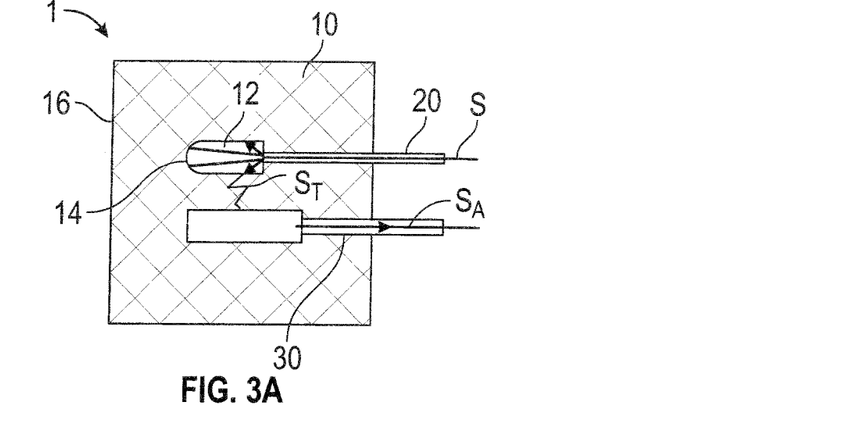
Figure 3B:
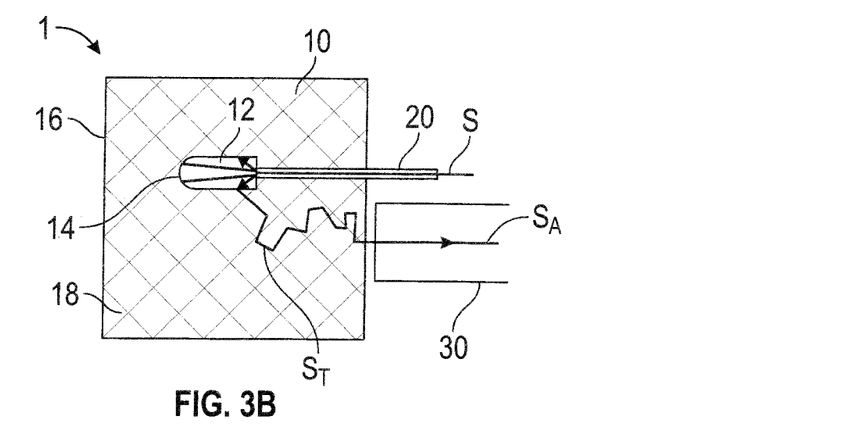

FIGS. 3a and 3b show a sectional view of a second embodiment of a gas cell 1 according to the invention. Here the cavity 12 has a convex shape, but not a spherical one. In the embodiment shown in FIG. 3a the out-coupling device 30 is arranged at a distance from the cavity 12 in the area 18 of the body 10 containing the porous material. Thus, in each case a path length extension resulting from the scattering in the porous material is achieved.

FIG. 3b shows a modification of the embodiment shown in FIG. 3a. The out-coupling device 30, for example a light guide, is arranged completely outside of the gas cell 1. With this, an especially large fraction of the radiation reflected in the porous material is obtained (see beam ST).

Figure 4A:
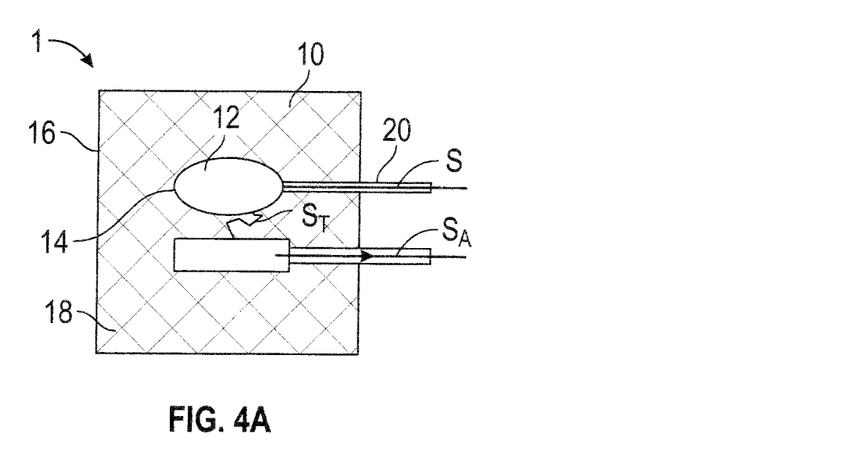

FIG. 4a shows a sectional view of a third embodiment of a gas cell 1 according to the invention. Here, the cavity 12 has the form of an ellipsoid. The in-coupling device 20 is connected with the cavity 12. The out-coupling device 30 is located at a distance from the cavity 12 in the area 18 of the body 10 containing the porous material. Thus, in any case, the radiation decoupled from the gas cell 1 by the out-coupling device 30 has traveled through the porous material (see beam ST).

Figure 4B:
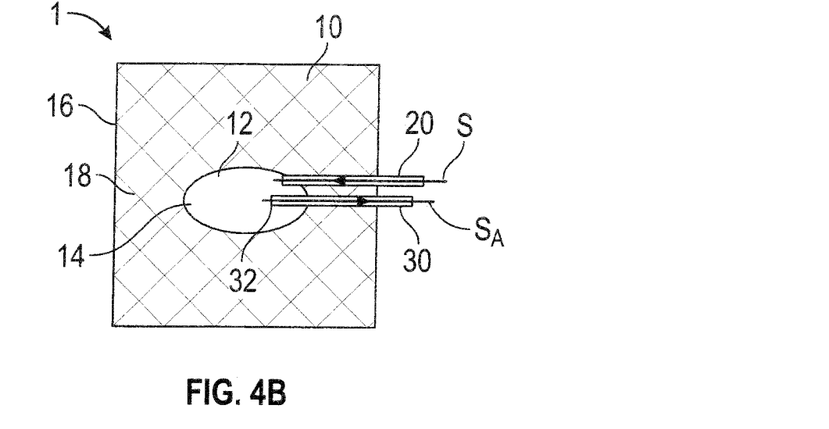

FIG. 4b shows a modification of the third embodiment shown in FIG. 4a. Here, the out-coupling device 30 is arranged such that the entry end 32 is arrange at the focal point of the ellipsoid.

Figure 5:
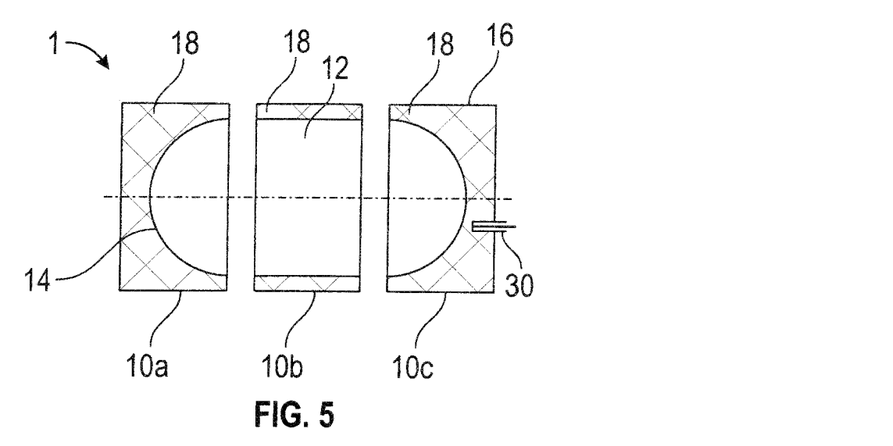

FIG. 5 shows a sectional view of components of a fourth embodiment of a gas cell 1 according to the invention. The body 10 of this gas cell 1 consists of three parts, a left-hand part 10a, a center part 10b and a right-hand part 10c. In parts 10a and 10c, in each case a spherical shell is hollowed out. In the center part 10b a cylindrical section is hollowed out. These recesses can be created by milling in a ceramic body. Parts 10a, 10b and 10c are then assembled and together form the body 10, in which the cavity 12 is formed.

Figure 6:
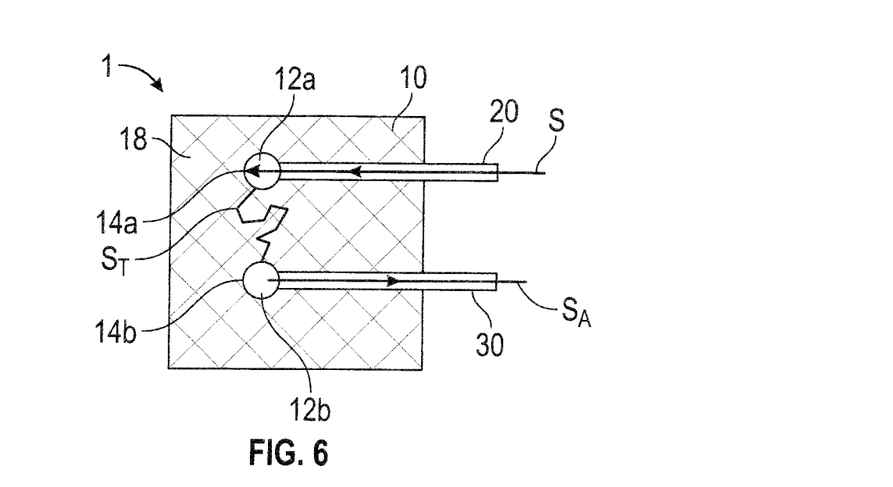

FIG. 6 shows a sectional view of a fifth embodiment of a gas cell according to the invention 1. In the body 10, two separate cavities 12a and 12b are provided, which in the view presented in FIG. 6 have the form of a spherical shell. The in-coupling device 20 is connected to the cavity 12a, so that electromagnetic radiation can be coupled in through the in-coupling device 20 into the cavity 12a. The out-coupling device 30 is connected with the cavity 12b. In order for the die radiation to be decoupled by the out-coupling device 30, it must pass from the first cavity 12a through the porous material into the second cavity 12b (beam $S_T$). Thus, in this embodiment as well, a contribution is obtained as a path length extension through the path of the radiation within the porous material.

REFERENCE SIGNS LIST

1 Gas cell
10 Body
12 Cavity
14 Inner surface
16 Outer surface
18 Area containing the porous material
20 In-coupling device
30 Out-coupling device
32 Entry end
S Incident beam of rays
$S_A$ Exiting beam of rays
$L_O$ Optical path length
V Gas cell volume

The invention claimed is:

1. A gas cell for the spectroscopic analysis of a gas, in which the gas is exposed to an incident beam of rays of electromagnetic radiation and a beam of rays of electromagnetic radiation exiting from the gas to form a measurement signal is recorded, wherein the gas cell comprises:
a body consisting of a porous material configured to scatter electromagnetic radiation upon encounter, an inner surface of the porous material forming a cavity configured to diffusely reflect and transmit the electromagnetic radiation upon encounter;
an in-coupling device for coupling the incident beam of rays into the gas cell; and
an out-coupling device for out-coupling the exiting beam of rays from the gas cell;
wherein the porous material is gas-permeable, such that the gas being measured is configured to penetrate into the cavity through the porous material when the gas cell is brought into contact with said gas being measured and to reside, in part, within the porous material during such measurement;
wherein the porous material is configured to permit at least some of the electromagnetic radiation to enter the porous material surrounding the cavity multiple times during such measurement, thereby permitting interaction with the portion of the gas being measured residing within the porous material;
wherein the out-coupling device has an end residing within the porous material and is configured to out-couple the electromagnetic radiation forming the exiting beam of rays from the area of the body containing the porous material.

2. The gas cell according to claim 1, wherein the porous material in which the cavity is formed comprises a porous ceramic material.

3. The gas cell according to claim 2, wherein the porous material has a porosity that is between 25% and 70%.

4. The gas cell according to claim 1, wherein the cavity has the form of a spherical shell with radius $R_K$.

5. The gas cell according to claim 4, wherein:
the radius $R_K$ of the spherical shell is selected considering a signal-to-noise ratio; and
the radius $R_K$ of the spherical shell is a minimum of 2 mm.

6. The gas cell according to claim 1, wherein the body has an outer surface which surrounds the inner surface of the cavity at a distance such that an amount of a leakage radiation exiting at the outer surface is less than a predetermined loss limit of the intensity of the incident beam of rays.

7. The gas cell according to claim 6, wherein the predetermined loss limit is less than or equal to 99% of the intensity of the incident beam of rays.

8. The gas cell according to claim 1, wherein a relationship Lo/V of an optical path length Lo traveled in the gas cell by the beam of rays to a volume V enclosed by the external surface of the body of the gas cell is greater than or equal to $1 \times 10^5$ m$^{-2}$.

9. The gas cell according to claim 1, wherein the in-coupling device is configured to provide divergent coupling of the incident beam of rays into the cavity.

10. The gas cell according to claim 1, further comprising a respective light guide in each of the in-coupling device and the out-coupling device, wherein the in-coupling device extends from and through the body to the cavity, and is configured to couple the electromagnetic radiation of the incident beam of rays into the cavity, at least in part by way of the light guide in the in-coupling device, and wherein the out-coupling device is configured to out-couple the electromagnetic radiation forming the exiting beam of rays from the cavity, at least in part by way of the light guide in the out-coupling device.

11. The gas cell according to claim 1, wherein an amount of the area occupied in the body by at least one of the in-coupling device and the out-coupling device is selected considering at least one of: an absorbance and a signal-to-noise ratio.

12. The gas cell according to claim 1, wherein:
the body is configured to act as a filter and/or a flame arrestor for the cavity.

13. The gas cell according to claim 12 wherein:
a distance between the inner surface of the cavity and an outer surface of the body is greater than or equal to 3 mm.

14. The gas cell according to claim 1 wherein:
the in-coupling device and the out-coupling device are arranged on a same side of the body.

15. The gas cell according to claim 14 wherein:
the in-coupling device and the out-coupling device are two separate and distinct parts.

16. The gas cell according to claim 1 wherein:
the inner surface of the porous material of the body further defines a second cavity;
the in-coupling device is connected to the cavity; and
the out-coupling device is connected to the second cavity.

17. An arrangement for the absorption spectroscopic analysis of a gas, comprising:
a gas cell according to claim 1;
a source of electromagnetic radiation for generating the incident beam of rays; and
a detector arrangement for detecting the exiting beam of rays.

18. The arrangement according to claim 17, wherein the source of electromagnetic radiation has a tuneable laser diode.

19. A method of performing spectroscopic analysis of a gas using the gas cell of claim 1, said method comprising:
positioning the gas cell within the gas being measured, thereby allowing the gas being measured to penetrate from outside of the body into the cavity through the porous material and to reside, in part, within the porous material;
exposing the gas being measured to the incident beam of rays of electromagnetic radiation by way of the in-coupling device, thereby causing interaction with the gas being measured, including within the porous material multiple times; and
generating the measurement signal from the beam of rays of electromagnetic radiation exiting from the body by way of the out-coupling device.

20. A gas cell for the spectroscopic analysis of a gas, in which the gas is exposed to an incident beam of rays of electromagnetic radiation and a beam of rays of electromagnetic radiation exiting from the gas to form a measurement signal is recorded, wherein the gas cell comprises:
a body consisting of a porous material configured to scatter electromagnetic radiation upon encounter, an inner surface of the porous material forming a first cavity and a second cavity, each configured to diffusely reflect and transmit the electromagnetic radiation upon encounter;
an in-coupling device for coupling the incident beam of rays into the gas cell, wherein the in-coupling device is connected to the first cavity; and
an out-coupling device for out-coupling the exiting beam of rays from the gas cell, wherein the out-coupling device is connected to the second cavity;
wherein the porous material is gas-permeable, such that the gas being measured is configured to penetrate into the cavity through the porous material when the gas cell is brought into contact with said gas being measured and to reside, in part, within the porous material during such measurement;
wherein the porous material is configured to permit at least some of the electromagnetic radiation to enter the porous material surrounding the cavity multiple times during such measurement, thereby permitting interaction with the portion of the gas being measured residing within the porous material.

* * * * *